United States Patent
Lee et al.

(10) Patent No.: US 7,568,819 B2
(45) Date of Patent: Aug. 4, 2009

(54) UTILIZING AN INTERNAL REFLECTION SURFACE TO REFLECT AND COLLIMATE SIDELIGHT IN AN OPTICAL NAVIGATION DEVICE

(75) Inventors: Boon Kheng Lee, Kedah (MY); Soon Chun Kuek, Penang (MY); Sai Mun Lee, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 316 days.

(21) Appl. No.: 11/449,268

(22) Filed: Jun. 7, 2006

(65) Prior Publication Data

US 2007/0285392 A1  Dec. 13, 2007

(51) Int. Cl.
*F21V 5/00* (2006.01)
(52) U.S. Cl. .................... 362/311; 362/346; 362/615; 362/619; 362/623; 362/625
(58) Field of Classification Search .............. 362/311, 362/346, 615–617, 619–623, 625; 356/445–448, 356/402, 425; 250/206.1, 559.29, 559.32; 345/163, 166, 179; 340/870.29; 315/151; 313/512
See application file for complete search history.

(56) References Cited

U.S. PATENT DOCUMENTS

| 7,018,073 | B2* | 3/2006 | Koegler et al. ............... 362/296 |
| 7,310,453 | B2* | 12/2007 | Ichikawa et al. ............... 385/3 |
| 2004/0042232 | A1* | 3/2004 | Huang et al. ................. 362/560 |
| 2005/0024623 | A1* | 2/2005 | Xie et al. .................... 356/3.01 |

FOREIGN PATENT DOCUMENTS

CN  1504952  6/2004

* cited by examiner

*Primary Examiner*—Sandra L O'Shea
*Assistant Examiner*—Mark Tsidulko

(57) ABSTRACT

An optical navigation devices and methods that utilize an internal reflection surface to reflect and collimate sidelight from a light source are described. A light source is configured to emit light. The sidelight from the light source is reflected and collimated by an internal reflection surface towards a work surface. The light received by the sensor is used to measure movement of the optical navigation device relative to the work surface.

24 Claims, 4 Drawing Sheets

UTILIZING AN INTERNAL REFLECTION SURFACE TO REFLECT AND COLLIMATE SIDELIGHT IN AN OPTICAL NAVIGATION DEVICE

TECHNOLOGY

Embodiments of the present invention relate to optical navigation devices.

BACKGROUND

An optical navigation device, such as an optical mouse, conventionally uses a packaged light-emitting diode (LED) to emit light onto a work surface. Typically, the light from the LED travels through a collimating lens and reflects off the work surface to a sensor. The reflection of the light produces a pattern that is captured by the sensor. The sensor can include, for example, a complementary metal-oxide semiconductor (CMOS) imager array. As an optical navigation device is moved relative to the work surface (or vice versa), successive images (frames) are rapidly captured and compared to measure the amount of movement. The difference between successive images indicates the amount of movement.

For a variety of reasons, an end user may desire a small form optical navigation device. In one instance, the end user may be a mobile professional that appreciates compact devices. In another instance, the end user may be a child and a smaller optical navigation device may be more suitable. In still another instance, the end user may simply desire a small form optical navigation device for its appearance.

Usually, one limiting factor on shrinking an optical navigation device is the size of the LED assembly. A typical LED assembly, such as a LED package, includes a reflector cone that redirects sidelight from the LED into a desired direction in addition to a bare LED die. However, utilizing a reflector cone only contributes to an increase in size. Furthermore, a LED package is approximately three times more expensive than a bare LED die.

Furthermore, sidelight and stray light from a light source may be difficult to fully capture and/or redirect, which can lead to a decline in the performance of the optical navigation device. Specifically, the stray light noise can interfere with the sensor's ability to detect movement of the optical navigation device. Further, since the light source emits light all directions and not just towards a work surface, if some of the light is not redirected, low illumination efficiency will result.

SUMMARY

Embodiments of the present invention pertain to optical navigation devices and methods that utilize an internal reflection surface to reflect and collimate sidelight from a light source. In one embodiment, a light source is configured to emit light. The sidelight from the light source is reflected and collimated by an internal reflection surface towards a work surface. The light received by the sensor is used to measure movement of the optical navigation device relative to the work surface.

These and other features, aspects and advantages of the present invention will become better understood after having read the following detailed description that is illustrated in the various drawing figures.

BRIEF DESCRIPTION

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Figure 1:
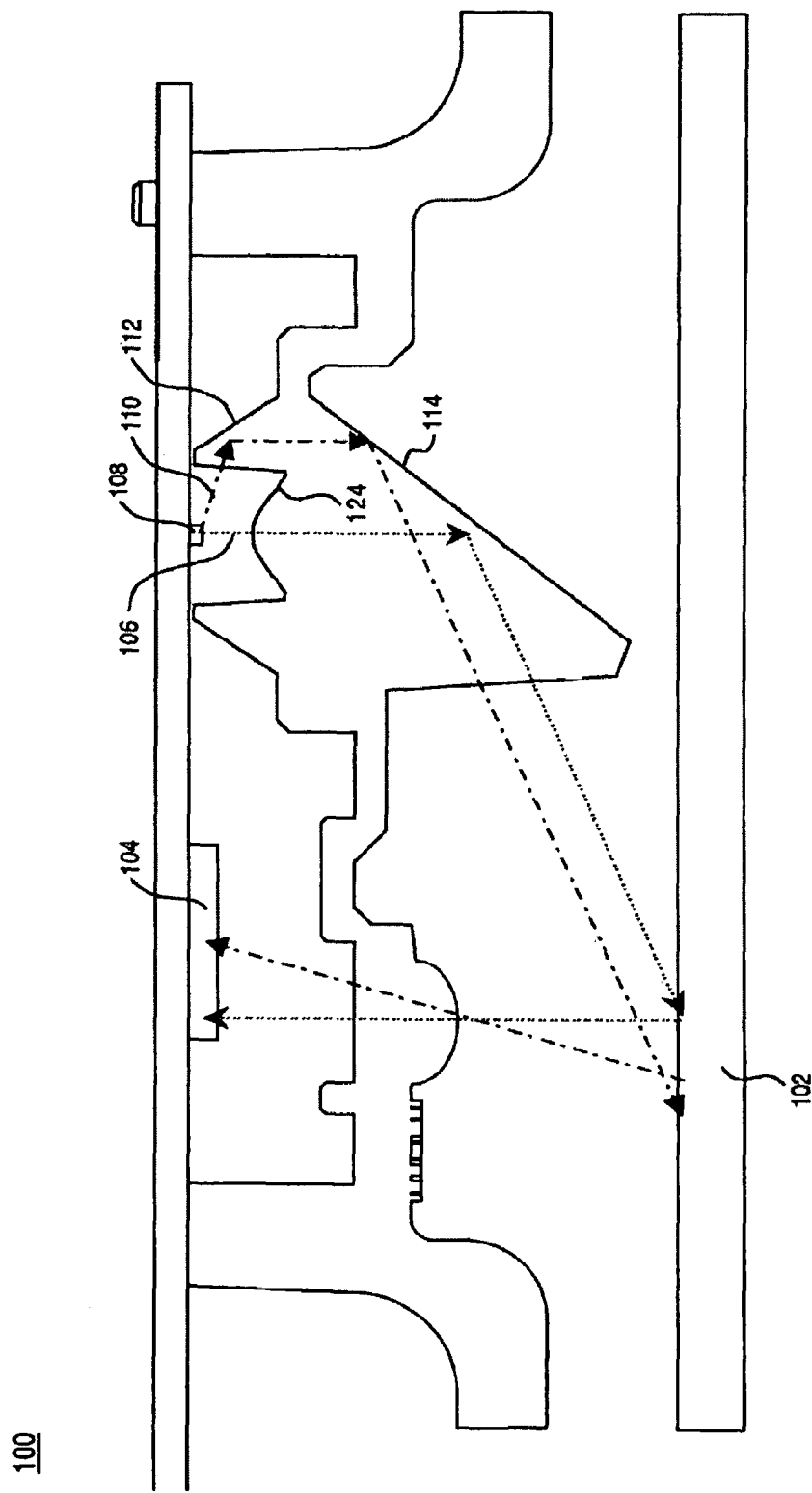
FIG. 1 is a cross-sectional view of an optical navigation device that comprises an internal reflection surface disposed to reflect and collimate sidelight from a light source, in accordance with an embodiment of the present invention.

FIG. 1 is a cross-sectional view of an optical navigation device 100, in accordance with an embodiment of the present invention. Optical navigation device 100 can be a cursor control or directing device such as an optical mouse, for example. Optical navigation device 100 can include elements other than those illustrated and described herein.

In the present embodiment, optical navigation device 100 includes a light source 108, an internal reflection surface 112, a work surface 102, a sensor 104, a first light ray 106, a second light ray 110, an aspheric surface 124, and a reflection surface 114. In one embodiment, internal reflection surface 112 is a total internal reflection surface. Further, in another embodiment, light source 108 is a bare light emitting diode (LED) die. In yet another embodiment, light source 108 is a packaged LED. In still another embodiment, light source 108 is a laser, e.g., vertical cavity surface emitting laser (VCSEL).

In one embodiment, sensor 104 includes, for example, a charged-coupled device (CCD), or a complementary metal-oxide semiconductor (CMOS) sensor array. Sensor 104 can include other elements, such as but not limited to circuitry and other electronics related to an imaging system. Also, it is appreciated that the sensor 104 may be a 1-dimensional (1-D) or 2-dimensional (2-D) sensor array that includes an array of individual photosensors that generate navigation information such as image information or spatial filtering information. Additionally, in one embodiment the sensor 104 may be a single sensor, such as a single photodiode.

When a light ray traveling in a first medium is incident upon a second medium of a lesser index of refraction, the light ray is refracted away from the normal, and, thus, the exit angle is greater than the incident angle. As the incident angle increases to a critical angle (depending on the index of refraction of the first and second medium involved), the exit angle reaches ninety degrees. If the incident angle is greater than the critical angle, total internal reflection occurs. In one embodiment, internal reflection surface 112 comprises surface shaped and positioned in such a way that light rays from a light source, e.g., a bare LED die, form incident angles that exceed the critical angle with the surface, causing total internal reflection. In one embodiment, internal reflection surface 112 comprises, for example, a parabolic or hyperbolic shaped surface. Also, it is appreciated that the internal reflection surface 112 can be comprised of a variety of materials, for example, polycarbonate or other compatible materials with a suitable index of refraction. In addition, it is appreciated that light source 108 can emit greater or fewer than the two light rays (106 and 110) shown in FIG. 1.

In the present embodiment, a first light ray 106 (a top light ray) is emitted by light source 108 of FIG. 1. As first light ray 106 travels towards reflection surface 114, it passes through aspheric surface 124, which collimates the first light ray 106. Upon reaching reflection surface 114, first light ray 106 reflects off of reflection surface 114 to work surface 102, and upon reaching work surface 102, reflects off of work surface 102 to sensor 104. In another embodiment, a second light ray 110 (a sidelight ray) is emitted by light source 108 of FIG. 1. The total internal reflection surface 112 effectively collimates and redirects second light ray 110 (a sidelight ray) to reflection surface 114. Upon reaching reflection surface 114, second light ray 110 reflects off of reflection surface 114 to work surface 102, and upon reaching work surface 102, reflects off of work surface 102 to sensor 104.

Thus, according to the present embodiment, a portion of uncollimated sidelight is redirected by the internal reflection surface 112 to eventually reach sensor 104. Consequently, a higher light efficiency can be achieved because a greater percentage of light emitted by light source 108 is utilized. Also, by using the internal reflection surface 112, e.g., a total internal reflection surface, instead of a reflector cone, in conjunction with a bare LED die, the overall size of the optical navigation device can be reduced. Moreover, frequently, bare LED dies are much less expensive than packaged LEDs. Thus, the present invention allows a smaller and more economical optical navigation device to be manufactured.

Light that is received by sensor 104 is used to detect and/or measure relative movement between the optical navigation device 100 and the work surface 102. The optical navigation device 100 is able to utilize sensor 104 take pictures of the work surface 102 quickly enough (e.g., 1500 pictures or frames per second is a typical rate) so that sequential images overlap. In this way, textual features of the work surface 102 are identified and tracked as the optical navigation device is moved relative to the work surface 102 (or vice versa). The sensor is able to identify common features between two or more frames and determine the distance between them. This information is translated into X and Y coordinates to indicate optical navigation device movement.

Figure 2:
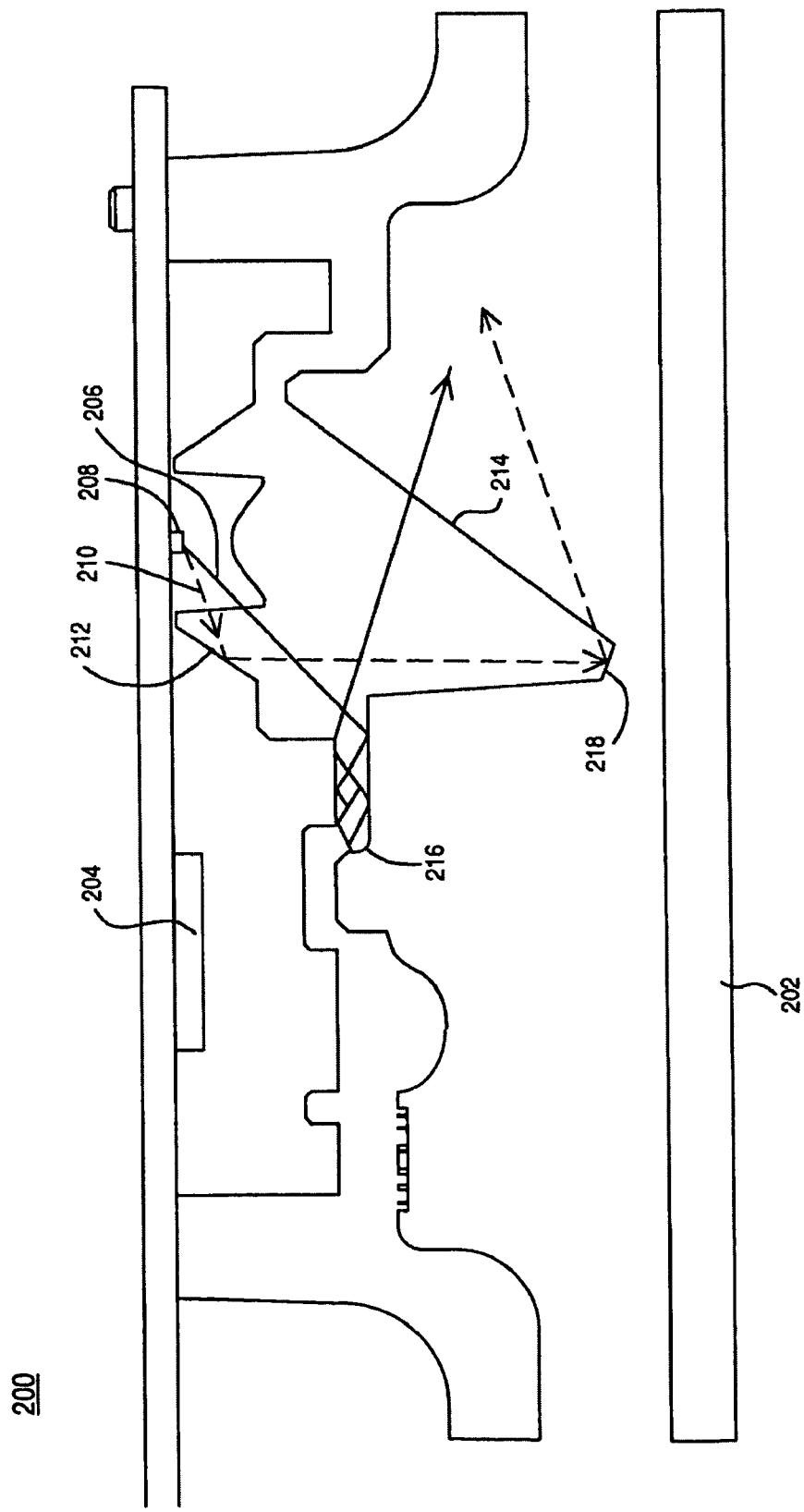
FIG. 2 is a cross-sectional view of an optical navigation device that comprises a stray light control to reduce the quantity of stray light reaching a sensor, in accordance with an embodiment of the present invention.

FIG. 2 is a cross-sectional view of an optical navigation device 200, in accordance with an embodiment of the present invention. Optical navigation device 200 can be a cursor control or directing device such as an optical mouse, for example. Optical navigation device 200 can include elements other than those illustrated and described herein.

In the present embodiment, optical navigation device 200 includes a light source 208, an internal reflection surface 212, surface 214, a work surface 202, a sensor 204, a first stray light ray 206, a second stray light ray 210, a first stray light control 216, and a second stray light control 218. It is appreciated that light source 208 can emit greater or fewer than the two stray light rays (206 and 210) shown in FIG. 2.

In one embodiment, light source 208 is a bare light emitting diode (LED) die. In another embodiment, light source 208 is a packaged LED. In yet another embodiment, light source 208 is a laser, e.g., vertical cavity surface emitting laser (VCSEL).

Also, in one embodiment, sensor 204 includes, for example, a charged-coupled device (CCD), or a complementary metal-oxide semiconductor (CMOS) sensor array. Sensor 204 can include other elements, such as but not limited to circuitry and other electronics related to an imaging system. Also, it is appreciated that the sensor 204 may be a 1-dimensional (1-D) or 2-dimensional (2-D) sensor array that includes an array of individual photosensors that generate navigation information such as image information or spatial filtering information. Additionally, in one embodiment the sensor 204 may be a single sensor, such as a single photodiode.

Further, in one embodiment, internal reflection surface 212 is a total internal reflection surface. In addition, in one embodiment, second stray light control 218 is a total internal reflection wedge. In another embodiment, first stray light control 216 is a groove design. Also, it is appreciated that the present invention can be implemented to include greater or fewer than the two stray light controls (216 and 218) shown in FIG. 2.

First stray light control 216 and second stray light control 218 cooperatively operate to efficiently minimize stray light from interfering with sensor 204 of optical navigation device 200. In the present embodiment, a first stray light ray 206 is emitted by light source 208 of FIG. 2. As the first stray light ray 206 travels away from light source 208, first stray light ray 206 enters first stray light control 216, e.g., a groove design. First stray light control 216 redirects first stray light ray 206 away from a light path that may interfere with sensor 204 and towards surface 214. First stray light ray 206 exits through surface 214 and does not interfere with sensor 204.

Also, in the present embodiment, a second stray light ray 210 is emitted by light source 208 of FIG. 2. As the second stray light ray 210 travels away from light source 208, second stray light ray 210 is redirected by internal reflection surface 212, e.g., a total internal reflection surface, towards second stray light control 218. As the second stray light ray 210 reaches second stray light control 218, second stray light control 218 redirects second stray light ray 210 away from a light path that may interfere with sensor 204 and towards surface 214. Second stray light ray 210 exits through surface 214 and does not interfere with sensor 204.

Thus, according to the present embodiment, stray light interference can be reduced, enabling sensor 204 to function more accurately. Consequently, an optical navigation device with improved tracking precision may be produced.

Figure 3:
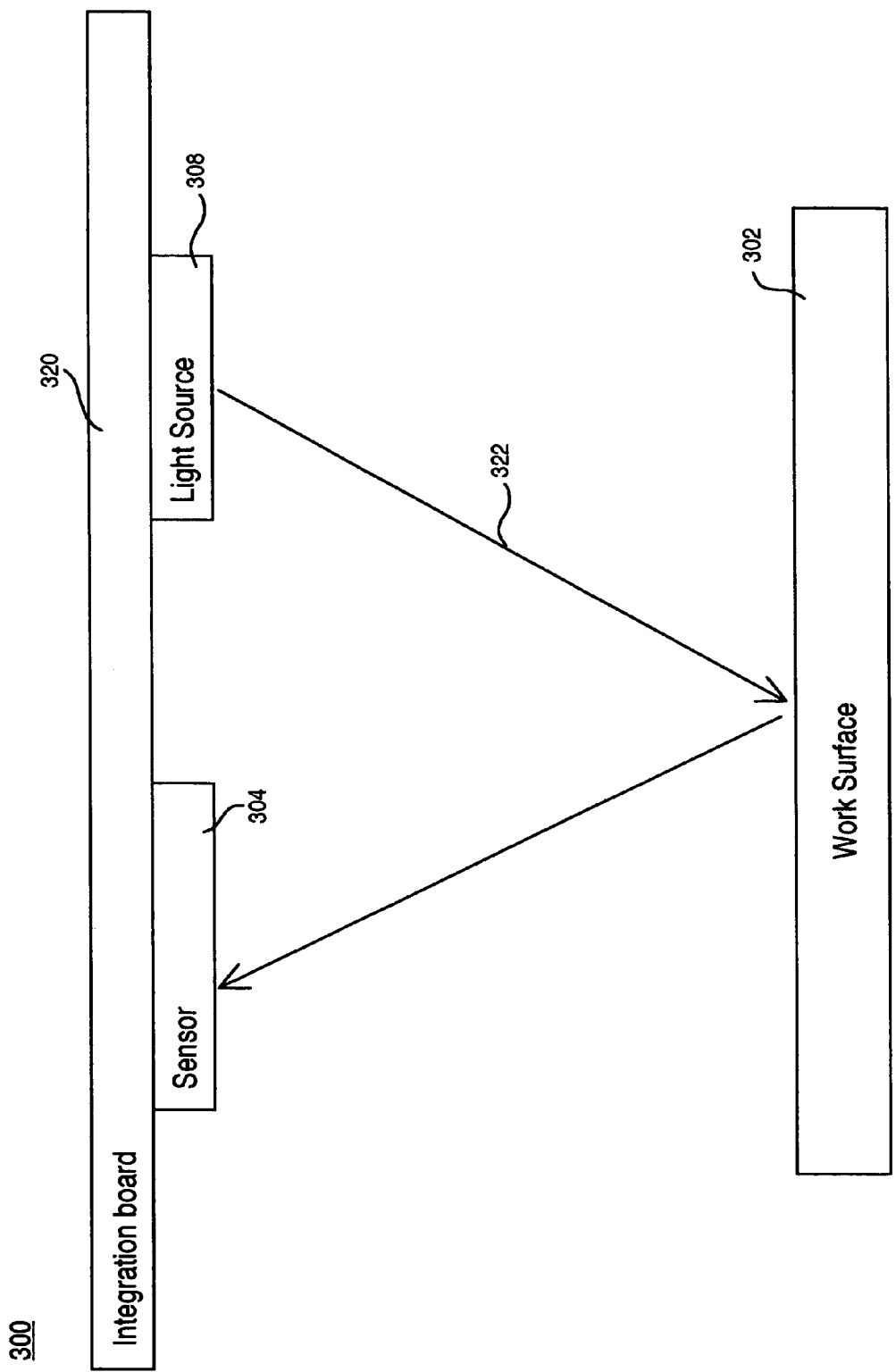
FIG. 3 is a cross-sectional view of an integrated optical piece that utilizes surface mount technology, in accordance with an embodiment of the present invention.

FIG. 3 is a cross-sectional view of an integrated optical piece 300, in accordance with an embodiment of the present invention. Integrated optical piece 300 can be utilized for a cursor control or directing device such as an optical mouse, for example. Integrated optical piece 300 can include elements other than those illustrated and described herein.

In the present embodiment, integrated optical piece 300 includes a light source 308, an integration board 320, light ray 322, a sensor 304, and a work surface 302. In one embodiment, light source 308 is a bare light emitting diode (LED) die. In another embodiment, light source 308 is a packaged LED. In still yet another embodiment, light source 308 is a laser, e.g., vertical cavity surface emitting laser (VCSEL). In yet another embodiment, light source 308 is a surface mount device (SMD).

In one embodiment, sensor 304 includes, for example, a charged-coupled device (CCD), or a complementary metal-oxide semiconductor (CMOS) sensor array. Sensor 304 can include other elements, such as but not limited to circuitry and other electronics related to an imaging system. Moreover, in another embodiment, integration surface 320 can be a printed circuit board (PCB).

Conventionally, a light source is attached to an integration board, e.g., a PCB, via through-hole technology. However, parts compatible with through-hole technology usually have leads that need to be guided through holes in the integration board. Frequently, when through-hole technology is utilized, manual assembly or a more complex automated assembly process is required.

Contrary to conventional approaches, the present invention is adaptable to utilizing surface mount technology and, in one embodiment, light source 308 is attached to integration board 320 using surface mount technology (SMT). SMT is a method for constructing electronic circuits in which the components are mounted directly onto the surface of printed circuit boards. An SMT component is usually smaller than its leaded counterpart because it has no leads or smaller leads. The main advantages of SMT over through-hole techniques are smaller components and simpler automated assembly. Because a more accurate automated machine assembly method can be utilized, a better overall stack-up tolerance can be achieved. Usually, with a packaged LED, the stack-up tolerance is relatively high, e.g., a few millimeters. In contrast, with a SMT bare LED die, the stack-up tolerance is usually relatively low, e.g., a few microns.

Thus, according to the embodiments of the present invention, by utilizing surface mount technology, an integrated optical piece with lower stack-up tolerance can be produced. Also, since SMT is compatible with a simpler automated assembly process, the cost for the integrated optical piece may be reduced.

Figure 4:
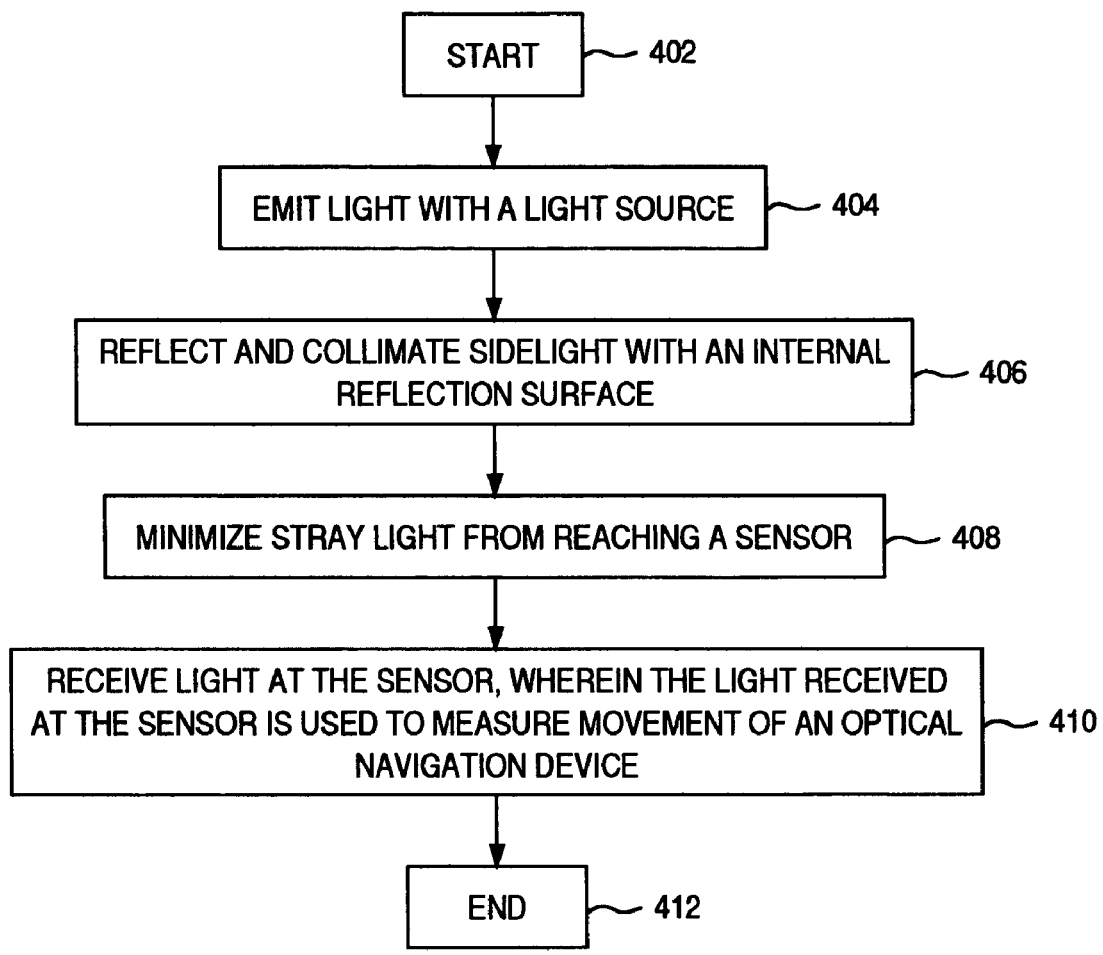
FIG. 4 is a flow chart of an optical navigation method that comprises reflecting and collimating sidelight from a light source, in accordance with an embodiment of the present invention.

FIG. 4 is a flow chart 400 of an optical navigation method according to one embodiment of the present invention. Although specific steps are disclosed in flowchart 400, such steps are exemplary. That is, embodiments of the present invention are well suited to performing various other or additional steps or variations of the steps recited in flowchart 400. It is appreciated that the steps in flowchart 400 may be performed in an order different than presented.

In step 404, light is emitted by a light source. It is appreciated that light source can emit light in various directions. For example, light source can emit sidelight (a light ray parallel to a work surface) and top light (a light ray perpendicular to a work surface). It is appreciated that light source can emit greater or fewer than the two light rays (106 and 110) shown in FIG. 1. Also, in one embodiment, the light source emits uncollimated light. Further, in another embodiment, the light source is a bare light emitting diode (LED) die. In still another embodiment, the light source is a packaged LED. In yet another embodiment, the light source is a laser, e.g., vertical cavity surface emitting laser (VCSEL).

In step 406, sidelight from the light source is reflected and collimated with an internal reflection surface. In one embodiment, internal reflection surface is a total internal reflection surface. In another embodiment, internal reflection surface comprises, for example, a parabolic or hyperbolic shaped surface. Also, it is appreciated that the internal reflection surface can be comprised of a variety of materials, for example, polycarbonate or other compatible materials with a suitable index of refraction.

In step 408, stray light is minimized from reaching a sensor with a stray light control. In one embodiment, the stray light control comprises a groove design. In another embodiment, the stray light control comprises an internal reflection wedge. Also, it is appreciated that the present invention can be implemented to include greater or fewer than the two stray light controls (216 and 218) shown in FIG. 2.

In step 410, light is received at the sensor. The light received at the sensor is used to measure movement of an optical navigation device. In one embodiment, sensor includes, for example, a charged-coupled device (CCD), or a complementary metal-oxide semiconductor (CMOS) sensor array. Sensor can include other elements, such as but not limited to circuitry and other electronics related to an imaging system.

An optical navigation devices and methods that utilize an internal reflection surface to reflect and collimate sidelight from a light source are described. In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An optical navigation device comprising:
    a light source disposed to emit light, including sidelight;
    a reflection surface disposed to reflect at least some of said light from said light source to a work surface;
    an internal reflection surface disposed to reflect at least some of said sidelight from said light source toward said reflection surface to be reflected to said work surface by said reflection surface; and
    a sensor disposed to receive light reflected from said work surface, wherein light received by said sensor is used to measure movement of said optical navigation device relative to said work surface.

2. The optical navigation device of claim 1, wherein said light source is a bare light emitting diode die.

3. The optical navigation device of claim 1, wherein said light source is a packaged light emitting diode.

4. The optical navigation device of claim 1, wherein said internal reflection surface comprises a total internal reflection (TIR) surface.

5. The optical navigation device of claim 1, wherein said internal reflection surface comprises a parabolic shape.

6. The optical navigation device of claim 1, wherein said internal reflection surface comprises a hyperbolic shape.

7. The optical navigation device of claim 1, wherein said sensor comprises a complementary metal-oxide semiconductor imager.

8. The optical navigation device of claim 1, further comprising a stray light control to reduce the quantity of stray light reaching said sensor, wherein said stray light control comprises an internal reflection wedge.

9. An optical navigation device comprising:
    a light source disposed to emit light;
    a sensor disposed to receive light reflected from a work surface, wherein light received by said sensor is used to measure movement of said optical navigation device relative to said work surface; and
    a stray light control to reduce the quantity of stray light reaching said sensor, wherein said stray light control comprises an internal reflection wedge.

10. The optical navigation device of claim 9, wherein said light source is a bare light emitting diode die.

11. The optical navigation device of claim 9, wherein said light source is a packaged light emitting diode.

12. The optical navigation device of claim 9, wherein said stray light control comprises a groove design.

13. The optical navigation device of claim 9, wherein said sensor comprises a complementary metal-oxide semiconductor imager.

14. The optical navigation device of claim 9, wherein said sensor comprises a charge-coupled device imager.

15. An integrated optical piece comprising:
   a bare light emitting diode die disposed to emit light that includes sidelight, wherein said bare light emitting diode die is attached to said integrated optical piece using surface mount technology;
   a reflection surface disposed to reflect at least some of said light from said light source to a work surface;
   an internal reflection surface disposed to reflect at least some of said sidelight from said light source toward said reflection surface to be reflected to said work surface by said reflection surface; and
   a sensor disposed to receive light reflected from said work surface, wherein light received by said sensor is used to measure movement of said optical navigation device relative to said work surface.

16. The integrated optical piece of claim 15, wherein said sensor comprises a complementary metal-oxide semiconductor imager.

17. The integrated optical piece of claim 15, wherein said sensor comprises a charge-coupled device imager.

18. The integrated optical piece of claim 15, wherein said surface mount technology is compatible with automated assembly.

19. An optical navigation method comprising:
   emitting light with a light source, wherein said light comprises sidelight;
   reflecting at least some of said light from said light source with a reflection surface toward a work surface;
   reflecting at least some of said sidelight from said light source with an internal reflection surface toward the reflection surface to be reflected to said work surface by said reflection surface; and
   receiving said light at a sensor, wherein said light received at said sensor is used to measure movement of an optical navigation device relative to said work surface.

20. The optical navigation method of claim 19, wherein said light source is a bare light emitting diode die.

21. The optical navigation method of claim 19, wherein said light source is a light emitting diode package.

22. The optical navigation method of claim 19, further comprises reducing stray light from reaching said sensor with a stray light control.

23. The optical navigation method of claim 22, wherein said stray light control comprises a groove design.

24. The optical navigation method of claim 22, wherein said stray light control comprises an internal reflection wedge.

* * * * *